(12) United States Patent
Kustosch

(10) Patent No.: US 7,509,193 B2
(45) Date of Patent: Mar. 24, 2009

(54) METHOD AND DEVICE FOR LIMITING THE DRIVING SPEED OF A MOTOR VEHICLE

(75) Inventor: Mario Kustosch, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 644 days.

(21) Appl. No.: 10/517,159

(22) PCT Filed: Nov. 26, 2002

(86) PCT No.: PCT/DE02/04331

§ 371 (c)(1),
(2), (4) Date: Aug. 10, 2005

(87) PCT Pub. No.: WO03/106208

PCT Pub. Date: Dec. 24, 2003

(65) Prior Publication Data

US 2006/0100755 A1    May 11, 2006

(30) Foreign Application Priority Data

Jun. 15, 2002    (DE) .............................. 102 26 678

(51) Int. Cl.
*B60L 9/00*    (2006.01)
*B60T 8/32*    (2006.01)
*G60G 77/06*    (2006.01)
*G60F 7/00*    (2006.01)
*F16H 59/30*    (2006.01)

(52) U.S. Cl. .................. 701/22; 477/121; 477/107; 477/111; 477/902; 477/64; 701/93; 701/123; 701/52; 701/53; 701/54; 701/55; 701/56; 123/333; 123/397; 123/399; 324/428; 320/48

(58) Field of Classification Search ................. 701/93, 701/22, 123, 52–56; 477/121, 111, 902, 477/64, 102, 107–110, 156; 123/333, 397, 123/399; 324/428; 320/48
See application file for complete search history.

(56) References Cited

U.S. PATENT DOCUMENTS

| 4,463,427 A |   | 7/1984 | Bonnetain et al. |
| 5,627,752 A | * | 5/1997 | Buck et al. ................. 701/35 |
| 6,086,511 A | * | 7/2000 | Droge ....................... 477/121 |

FOREIGN PATENT DOCUMENTS

| DE | 32 36 990 | 4/1984 |
| DE | 43 44 369 | 7/1995 |
| DE | 196 32 337 | 2/1998 |
| DE | 100 24 231 | 11/2001 |
| DE | 102 01 160 | 7/2003 |
| FR | 2 813 050 | 2/2002 |
| JP | 55005431 | 1/1980 |

* cited by examiner

*Primary Examiner*—Dalena Tran
*Assistant Examiner*—Ian Jen
(74) *Attorney, Agent, or Firm*—Kenyon & Kenyon LLP

(57) ABSTRACT

A method and a device are provided for limiting the driving speed of a motor vehicle that allow a selectable, fixed fuel consumption per distance traveled to be maintained without limiting short-term acceleration. In this context, the driving speed is limited to a maximum value (vmaxbe), at which a predefined maximum fuel consumption (Besetpoint) for steady driving speed is not exceeded.

10 Claims, 2 Drawing Sheets

METHOD AND DEVICE FOR LIMITING THE DRIVING SPEED OF A MOTOR VEHICLE

FIELD OF THE INVENTION

The present invention relates to a method and a device for limiting the driving speed of a motor vehicle.

BACKGROUND INFORMATION

A method for limiting the driving speed of a motor vehicle is discussed in German Patent Application No. 102 01 160.

SUMMARY OF THE INVENTION

In the method and the device of the present invention for limiting the driving speed of a motor vehicle, the driving speed is limited to a maximum value at which a predefined maximum fuel consumption for a fixed driving speed is not exceeded. A set, fixed fuel consumption can be maintained in this manner without limiting short-term acceleration. As a result, an economic manner of driving can be automated according to driver requirements.

The maximum value for the driving speed may be determined from a maximum drive power of the vehicle, resulting from the relationship between the predefined maximum fuel consumption and a specific fuel consumption of the engine at a current operating point, via an inverse characteristic curve for a speed-dependent proportion of the driving resistance. In this manner, the maximum value for the driving speed can be determined particularly simply and easily. It is particularly advantageous when the maximum drive power is corrected by a speed-independent proportion of the driving resistance. The accuracy of the determination of the maximum value for the driving speed is increased in this manner.

The speed-independent proportion of the driving resistance may also be filtered, in particular via a first order low pass filter. Noise influences in the calculation of the speed-independent proportion of the driving resistance can be largely equalized in this manner.

Moreover, it may be useful to limit the driving speed as a function of the predefined maximum fuel consumption only when the gradient of a driving pedal position is less than a predefined value or a kick-down function is deactivated. In this manner, it is ensured that the fuel consumption-dependent limiting of the driving speed is invalidated in situations in which the driver is primarily concerned with achieving a driving speed that is as fast as possible. As a result, the driving safety, e.g., during passing operations, is ensured.

DETAILED DESCRIPTION

Figure 1:
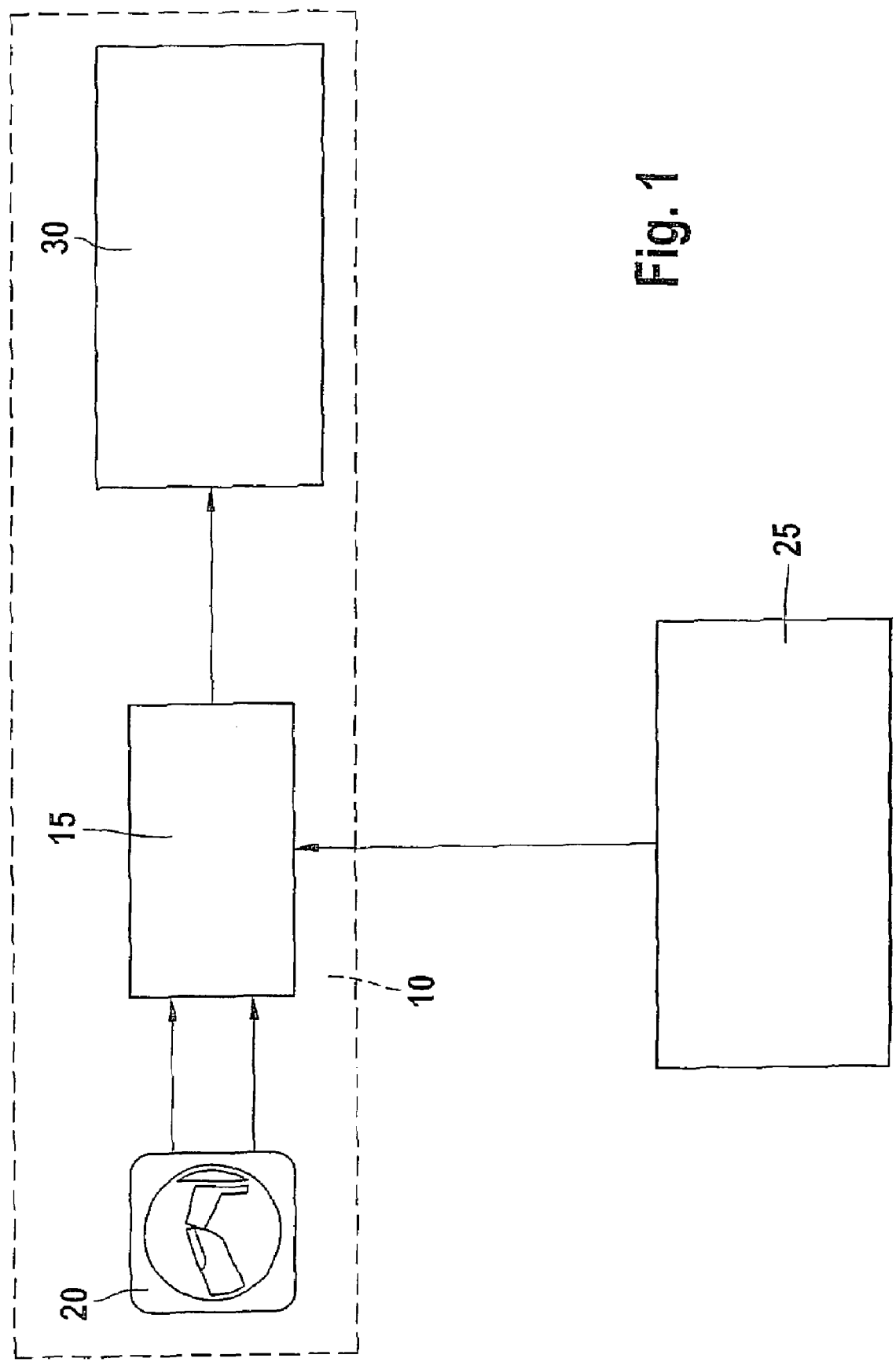
FIG. 1 shows a block diagram of an exemplary driving speed limitation using an embodiment of the device of the present invention.

FIG. 1 shows an exemplary system for speed limitation in a motor vehicle in the form of a block diagram. A device 10 for limiting the driving speed of the motor vehicle is provided in this context. Device 10 includes an input/control unit 20, which is connected to arrangement 15 for determining a maximum value vmaxbe, to which the driving speed is to be limited.

Maximum value vmaxbe for the driving speed is transmitted by arrangement 15 to arrangement 30, which perform the actual speed limiting function. In this context, arrangement 30 ensures that the current driving speed of the motor vehicle does not exceed maximum value vmaxbe for the driving speed. Input/control unit 20 allows the driver of the motor vehicle to define a maximum fuel consumption Besoll for a fixed driving speed. Moreover, the driver may activate arrangement 15 at input/control unit 20 such that the arrangement determines maximum value vmaxbe for the driving speed as a function of predefined maximum fuel consumption Besoll for a fixed driving speed. Input/control unit 20 generates an activation signal "ON" to activate arrangement 15. Correspondingly, the driver may deactivate arrangement 15 at input/control unit 20 such that maximum value vmaxbe for the driving speed is not determined as a function of predefined maximum fuel consumption Besoll for a fixed driving speed. The input/control unit generates a deactivation signal "OFF" for arrangement 15 for this purpose.

FIG. 1 also shows an engine control 25, which provides device 10 and arrangement 15 with values for a transmission ratio factor üactual, an engine speed nmot, an actual engine torque Miactual, an actual acceleration aactual of the vehicle, an actual speed vactual of the vehicle, and a bit B_kdown, which indicates whether a kick-down of the vehicle was operated during use of an automatic transmission. The values for transmission ratio factor üactual, engine speed nmot, actual engine torque Miactual, actual acceleration aactual, and actual speed vactual are determined in a manner known from the related art. Bit B_kdown for operation of the kick-down is set during operation of the kick-down and is otherwise reset.

Figure 2:
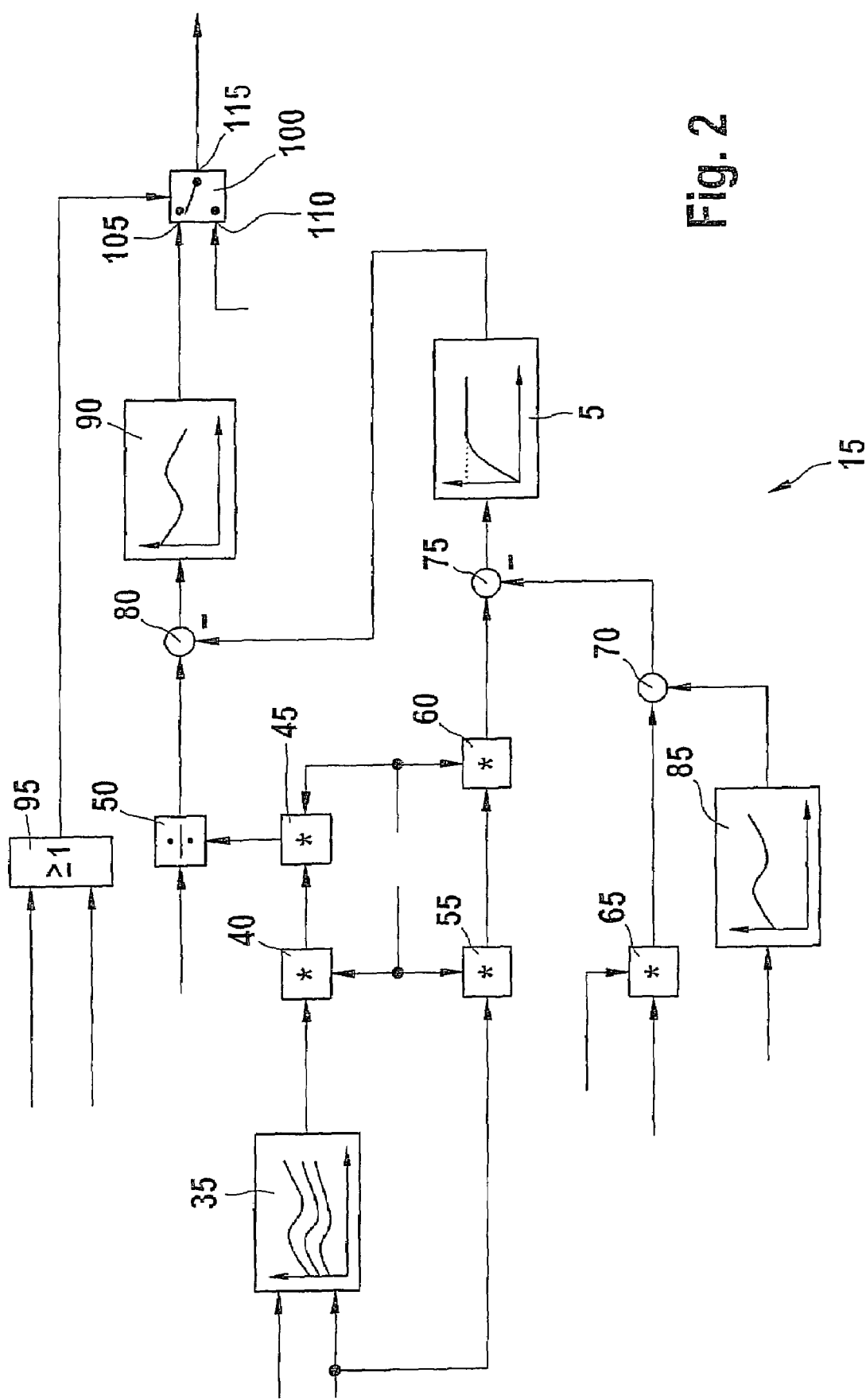
FIG. 2 shows an exemplary functional diagram for describing the structure of the device of the present invention and a flow of the method of the present invention.

FIG. 2 shows a functional diagram to describe the structure of arrangement 15 as well as the flow of the method of the invention. An engine consumption map 35 to which engine speed nmot and actual engine torque Miactual are supplied as input quantities is provided in this context. A specific fuel consumption beENG of the vehicle engine results as the output quantity at the current operating point that is characterized by engine speed nmot and actual engine torque Miactual. Engine consumption map 35 is determined as a standard for every engine by the manufacturer and is therefore known from the related art. Specific fuel consumption beENG of the engine is multiplied by transmission ratio factor üactual at a first operation point 40. The result of the multiplication operation is multiplied at a second operation point 45 by a wheel radius $r_{wheel}$ of the wheels of the vehicle, wheel radius $r_{wheel}$ being able to be known and stored in arrangement 15 or known in engine control 25 and transmitted to arrangement 15. The result of the multiplication operation is designated as bePT in FIG. 2 and supplied to a third operation point 50. The quotient is formed from predefined maximum fuel consumption Besetpoint for the fixed driving speed, and multiplication result bePT at third operation point 50 so that a maximum drive power $F_{BEsetpoint}$ of the vehicle results as follows:

$$F_{BEsetpoint} = Besetpoint/bePT \qquad (1)$$

Actual engine torque Miactual is also supplied to a fourth operation point 55 and multiplied there by transmission ratio factor üactual. The multiplication result is supplied to a fifth operation point 60 and multiplied there by wheel radius $r_{wheel}$. The multiplication result is current drive power FAN of the vehicle.

Actual acceleration aactual of the vehicle is multiplied by vehicle mass MFzg at a sixth operation point 65. The multiplication result is inertial force T of the vehicle. Vehicle mass MFzg may be known and stored in arrangement 15. Alternatively, vehicle mass MFzg may be known in engine control 25 and transmitted from there to arrangement 15. Actual speed vactual of the vehicle is supplied to a first characteristic curve 85 as an input quantity. First characteristic curve 85 provides a speed-dependent proportion fv of the driving resistance of the vehicle from actual speed vactual. Inertial force T and speed-dependent proportion fv of the driving resistance are added together at a seventh operation point 70. The addition result is subtracted from current drive power FAN of the vehicle at an eighth operation point 75. The subtraction result is supplied to a filter 5 to equalize noise influences on the measured value for actual acceleration aactual and to prevent quick changes of maximum value vmaxbe for the driving speed. Filter 5 may be a first order low pass filter, for example. The equalized output signal of filter 5 is supplied as speed-independent proportion Fα of the driving resistance to a ninth operation point 80 and is subtracted there from maximum drive power $F_{BEsetpoint}$. The subtraction result is supplied as an input quantity to a second characteristic curve 90, which is inverse to first characteristic curve 85 and provides a speed value $fv^{-1}$, which is supplied to a first input 105 of a controlled switch 100. A predefined absolute maximum speed VMAX, which is either preset in a fixed manner or may be defined by the user at input/control unit 20, is supplied to a second input 110 of controlled switch 100. Controlled switch 100 is controlled via an OR gate 95 to which deactivation signal "OFF" and bit B_kdown for the kick-down are supplied as input quantities. If one of the two input quantities "OFF" or B_kdown of OR gate 95 is set, i.e., the kick-down is operated or the driver used input/control unit 20 to deactivate the provision of maximum value vmaxbe for the driving speed as a function of predefined maximum fuel consumption Besetpoint for a fixed driving speed, the output of the OR gate is set and causes controlled switch 100 to connect second input 110 to output 115 of controlled switch 100. In this case, predefined absolute maximum speed VMAX is supplied to arrangement 30 as maximum value vmaxbe for the driving speed. However, if the output of OR gate 95 is reset, i.e., neither the kick-down is operated nor the determination of maximum value vmaxbe for the driving speed as a function of predefined maximum fuel consumption Besetpoint for a fixed driving speed, is deactivated by the driver at input/control unit 20, the reset output of OR gate 95 causes controlled switch 100 to connect first input 105 to output 115 so that output $fv^{-1}$ of second characteristic curve 90 is supplied to arrangement 30 as maximum value vmaxbe for the driving speed.

The speed limitation function performed by arrangement 30 is a function of the vehicle longitudinal motion that allows the driver to define a maximum value vmaxbe for the driving speed that may not be exceeded by actual speed vactual of the vehicle. This benefits driving safety as well as fuel consumption. If the driver would like to use the speed limitation function for limiting to a desired fuel consumption, this is not possible by only defining maximum value vmaxbe for the driving speed since fuel consumption also depends on speed-independent parameters, such as incline, engine operating point, or head wind. Fuel consumption is a fuel consumption per distance in this exemplary embodiment, i.e., fuel consumption per distance traveled, for example, the fuel consumption per 100 km of distance traveled.

Arrangement 15 described here may be used to calculate maximum value vmaxbe for the driving speed as output $fv^{-1}$ of second characteristic curve 90 so that predefined maximum fuel consumption Besetpoint for a fixed driving speed is not exceeded. Actual value Be for the fuel consumption per distance traveled may be calculated according to the following formula:

$$Be = \left[beENG(nmot, Miactual) * \int (Froll(vactual) + Fair(vactual) + MFzg*aactual + Fbr + F\alpha) * vactualdt\right] / \int vactualdt \quad (2)$$

The objective is to solve equation (2) for actual speed vactual. If actual value Be for the fuel consumption per distance traveled is replaced by predefined maximum fuel consumption Besetpoint for a fixed driving speed, maximum value vmaxbe for the driving speed valid for predefined maximum fuel consumption Besetpoint is obtained instead of the actual speed. In this context, the vehicle acceleration under maximum value vmaxbe for the driving speed need not be limited as a function of predefined maximum fuel consumption Besetpoint so that the vehicle agility is not impaired. Therefore, only maximum value vmaxbe for the driving speed is calculated, the value resulting in the fixed drive case, i.e., in which actual acceleration aactual of the vehicle is equal to zero and the braking force Fbr of the vehicle in equation (2) is also equal to zero. The driving resistance of the vehicle is made up of speed-dependent proportion fv, which is made up of rolling resistance Froll and air resistance Fair in equation (2), as well as of speed-independent proportion Fα, which is made up of the climbing resistance and the force of the head-wind. Therefore, if actual acceleration aactual and braking force Fbr are each set to zero in equation (2), the following results:

$$Be=[beENG(nmot,Miactual)*[\int(Froll(vactual)+Fair(vactual))*vactual\, dt+F\alpha*vactual\, dt]/\int vactual\, dt \quad (3)$$

The following then results from equation (3):

$$Be/beENG(nmot,Miactual)-F\alpha=\int(Froll(vactual)+Fair(vactual))*vactual\, dt/\int vactual\, dt \quad (4)$$

The right side of equation (4) corresponds with the average force generated by rolling resistance Froll and air resistance Fair. The quotient on the left side of the equation may be interpreted following multiplication with transmission ratio factor üactual and wheel radius $r_{wheel}$ as a drive power $F_{Be}$ of the vehicle, which results from actual value Be of the fuel consumption per distance traveled in relation to specific fuel consumption BeENG of the engine at the current operating point. The right side of equation (4) may be determined in a vehicle experiment as first characteristic curve fv (vactual) via actual speed vactual. The determination may be performed as follows:

The vehicle is operated in windless conditions, on a flat driving surface, at a fixed actual speed vactual. Current drive power FAN of the vehicle is then determined from actual engine torque Miactual, as in FIG. 2 using fourth operation point 55 and fifth operation point 60, for any time period. The described vehicle experiment is conducted for a plurality of actual speeds vactual of the vehicle, which sufficiently cover the entire spectrum of possible actual speeds vactual of the vehicle. First characteristic curve 85 is formed in this manner. Actual speeds vactual of the vehicle then represent the data points of first characteristic curve 85.

The following relationship results from equation (4) on the basis of the described vehicle experiment:

$$Be/beENG(nmot, Miactual)-F\alpha = fv(vactual) \quad (5)$$

The driving resistances as a function increase strictly over actual speed vactual of the vehicle. As a result, first characteristic curve 85, which corresponds with function fv (vactual), can be inverted. The inverting of first characteristic curve 85 then corresponds with function $fv^{-1}$ (vactual) and second characteristic curve 90. Second characteristic curve 90 allows equation (5) to be solved for actual speed vactual of the vehicle:

$$vactual = fv^{-1}(Be/beENG(nmot, Miactual)-F\alpha) \quad (6)$$

If actual value Be for the fuel consumption per distance traveled is then replaced by predefined maximum fuel consumption Besetpoint for a fixed driving speed, equation (6) yields maximum value vmaxbe for the driving speed as output $fv^{-1}$ of second characteristic curve 90 instead of actual speed vactual of the vehicle. This is represented in the following equation:

$$v\,max\,be = fv^{-1}(Besetpoint/beENG(nmot, Miactual)-F\alpha) \quad (7)$$

Engine consumption map 35 is described in equation (7) as BeENG (nmot, Miactual) and is determined as described as a standard for every engine by the manufacturer and is therefore provided in means 15 in a manner known from the related art. Predefined maximum fuel consumption Besetpoint for a fixed driving speed may be defined by the driver at input/control unit 20. Therefore, only speed-independent proportion Fα of the driving resistance must still be calculated. Speed-independent proportion Fα of the driving resistance is able to be calculated according to FIG. 2 from the force balance at the vehicle in that speed-dependent proportion fv of the driving resistance and inertial force T represented by MFzg*aactual are subtracted from current drive power FAN of the vehicle in accordance with the following equation:

$$F\alpha = FAN - fv(vactual) - MFzg*aactual \quad (8)$$

Current drive power FAN of the vehicle may be formed from actual engine torque Miactual, transmission ratio factor üactual, and wheel radius $R_{wheel}$ in the manner described in FIG. 2. To prevent nervous vehicle behavior from quick changes of maximum value vmaxbe for the driving speed due to a distorted value for actual acceleration aactual, speed-independent proportion Fα of the driving resistance is filtered according to FIG. 2, e.g. by a first order low pass filter. As shown in and described with respect to FIG. 2, the driving speed is limited as a function of predefined maximum fuel consumption Besetpoint only when a kick-down function is deactivated, i.e., bit B_kdown is reset. Additionally or alternatively, it may be provided for the driving speed to be limited as a function of predefined maximum fuel consumption Besetpoint only when the gradient of a driving pedal position is less than a predefined value. If the gradient of the driving pedal position exceeds the predefined value, it is detected that the driver wants to accelerate as quickly as possible, similar to in the kick-down function, so that the limitation of the driving speed as a function predefined maximum fuel consumption Besetpoint is to be dispensed with also in this case and the driving speed is to be limited instead by predefined absolute maximum speed VMAX. Furthermore, as described with respect to FIG. 2, it may be provided for the driving speed to be limited as a function of predefined maximum fuel consumption Besetpoint only when the driver also activates arrangement 15 by setting the activation signal to "ON" at input/control unit 20. In this case, the deactivation signal "OFF" is reset. For the case that the driver deactivates arrangement 15 at input/control unit 20 by setting the deactivation signal "OFF", the driving speed is limited by predefined absolute maximum speed VMAX instead of as a function of predefined maximum fuel consumption Besetpoint as described in FIG. 2.

What is claimed is:

1. A method for limiting a driving speed of a motor vehicle, comprising:
   limiting the driving speed to a predefined maximum value, the maximum value corresponding to a predefined maximum fuel consumption for a steady driving speed;
   wherein:
      the maximum value for the driving speed is determined from a maximum drive power of the vehicle derived from a relationship between the predefined maximum fuel consumption and a specific fuel consumption of the engine of the vehicle at an instantaneous operating point, based on an inverse characteristic curve for a speed-dependent proportion of a total driving resistance;
      the maximum drive power of the vehicle is adjusted using a speed-independent proportion of the total driving resistance; and
      the speed-independent proportion of the total driving resistance is determined by subtracting the speed-dependent proportion of the total driving resistance and an inertial force of the vehicle from an instantaneous drive power of the vehicle.

2. The method of claim 1, wherein the speed-independent proportion of the total driving resistance is filtered using a first order low pass filter.

3. The method of claim 1, wherein the instantaneous drive power is determined using an actual engine torque, a wheel radius, and a transmission ratio factor.

4. The method of claim 1, wherein the specific fuel consumption is determined from a characteristic map as a function of an engine speed and an actual engine torque.

5. The method of claim 1, wherein the driving speed is limited as a function of the predefined maximum fuel consumption only when one of:
   a) the gradient of a driving pedal position is less than a predefined value; and
   b) a kick-down function is deactivated.

6. A device for limiting a driving speed of a motor vehicle, comprising:
   an arrangement for determining a maximum fuel consumption for a steady driving speed;
   an arrangement for limiting the driving speed to a maximum value corresponding to the determined maximum fuel consumption; and
   wherein:
      the maximum value for the driving speed is determined from a maximum drive power of the vehicle derived from a relationship between the predefined maximum fuel consumption and a specific fuel consumption of the engine of the vehicle at an instantaneous operating point, based on an inverse characteristic curve for a speed-dependent proportion of a total driving resistance;
      the maximum drive power of the vehicle is adjusted using a speed-independent proportion of the total driving resistance; and the speed-independent proportion of the total driving resistance is determined by subtracting the speed-dependent proportion of the total driving resistance and an inertial force of the vehicle from an instantaneous drive power of the vehicle.

7. The device of claim 6, wherein the speed-independent proportion of the total driving resistance is filtered using a first order low pass filter.

8. The device of claim 6, further comprising:
an arrangement that determines the instantaneous drive power using an actual engine torque, a wheel radius, and a transmission ratio factor.

9. The device of claim 6, further comprising:
an arrangement that determines the specific fuel consumption is determined from a characteristic map as a function of an engine speed and an actual engine torque.

10. The device of claim 6, wherein the driving speed is limited as a function of the predefined maximum fuel consumption only when one of:
a) the gradient of a driving pedal position is less than a predefined value; and
b) a kick-down function is deactivated.

* * * * *